Patented July 29, 1952

2,605,166

UNITED STATES PATENT OFFICE 2,605,166

PROCESS OF UTILIZING WASTE PRODUCTS OF THE MANUFACTURE OF 2-CHLORO-BUTADIENE-1,3

Stanislav Landa, Most, and Oldřich Němeček, Usti N/L, Czechoslovakia, assignors to Bata, narodni podnik, Zlin, Czechoslovakia No Drawing. Application December 30, 1946, Serial No. 719,332. In Germany April 9, 1943

Section 1, Public Law 690, August 8, 1946
Patent expires April 9, 1963

11 Claims. (Cl. 23—97)

The copending patent application of Čech and Albrecht, Serial No. 720,912, now Patent No. 2,515,335 of July 18, 1950, relates to the manufacture of condensation products of dichlorbutene with aromatic hydrocarbons or with aromatic hydroxylic compounds, by heating both components with aluminium chloride, zinc chloride or ferric chloride. The obtained condensation products are suitable as admixtures with rubber.

It has been found by the present invention that heavy oily residues containing chlorine, which are waste products of the treatment of reaction-products of monovinylacetylene with hydrogen chloride and which contain a considerable amount of copper and water, may be advantageously condensed with aromatic hydrocarbons e. g. with naphthalene, whereby salts of copper are obtained as by-products which either immediately or after a simple refinement may be repeatedly used as catalysts for the addition of hydrogen chloride on monovinylacetylene.

Those oily and aqueous residues form a complex mixture of unsaturated and saturated chlorine compounds of various molecular weight, containing a large amount of copper, partially in an organic complex composition. The recuperation of copper from these residues by usual methods is difficult and wasteful so that the regeneration may hardly pay. Even the oily organic remainders, after having been liberated of copper, did not find any technical utilization.

By the process of the present invention, the raw remainders are heated with aromatic hydrocarbons; after a certain time the original thick mass becomes thin and forms two layers. The upper layer, containing only a small amount of water, consists in a solution of oily products, containing chlorine in aromatic hydrocarbons, whereas the lower layer contains chiefly a concentrated water solution of copper salts. The lower layer is separated and treated to recover copper salts. The upper layer is subjected either immediately or after washing with water to a condensation. For this purpose condensation agents are added and the mixture is heated to a higher temperature. If $AlCl_3$ or $FeCl_3$ are used as condensation agents, it is necessary to liberate the upper layer of water. If $ZnCl_2$ is used, this step is not necessary.

Example 10 kg. of melted naphthalene is placed in a duplicator to which 200 kg. of aqueous oily residues from the production of 2-chlor-butadiene-1,3 is added. The mixture, which is rapidly heated to 60° C., and stirred, becomes thin; and after having stopped the stirring, two separate layers are produced. The lower layer, 58 kg., is separated from the upper layer which is then washed with warm water. This layer is then allowed to stand until a new aqueous layer forms on the bottom, which layer is being added to the first aqueous layer. These combined layers, containing copper salts are thickened and allowed to crystallize in fractions. In this way it is possible to obtain almost all the copper from the original residues, which may be used for the preparation of a catalyst for use in the reaction of hydrogen chloride on monovinylacetylene. To the upper layer is added 6 kg. of waterfree zinc chloride and then heated for 5 hours to a temperature of 85° C. under a continuous stirring. The mixture is then washed with hot water or with a weak solution of sodium hydroxide. Instead of zinc chloride, aluminium chloride or ferric chloride may be used. When using aluminium chloride, a heating of only one hour is sufficient. The obtained product is a dark coloured substance of a high viscosity, containing less than 0.1% of copper.

These products are suitable e. g. as raw material for the manufacture of protecting coatings or as rubber softenings.

In principle, it is possible to use phenols instead of hydrocarbons, but this is less advantageous because of the fact that then the separation of copper salts is more difficult.

We claim:

1. In a process of recovering valuable products by separating the copper salts from the oily ingredients of the aqueous, oily, copper-containing residue formed in the manufacture of 2-chlorobutadiene-1,3 by the reaction of hydrogen chloride with vinylacetylene in the presence of a copper catalyst, the steps of mixing the residue with at least one aromatic hydrocarbon, heating the mixture for a time sufficient to permit the formation of two superposed layers and separating said superposed layers, thus obtaining on the one hand the cupric and cuprous salts in an oil-free aqueous solution forming the lower layer and on the other hand the oily ingredients in a copper-free oily solution forming the upper layer.

2. In a process of recovering valuable products by separating the copper salts from the oily ingredients of the aqueous, oily, copper-containing residue formed in the manufacture of 2-chlorobutadiene-1,3 by the reaction of hydrogen chloride with vinylacetylene in the presence of a copper catalyst, the steps of mixing the residue with naphthalene, heating the mixture for a time sufficient to permit the formation of two superposed layers and separating said superposed layers, thus obtaining on the one hand the cupric and cuprous salts in an oil-free aqueous solution forming the lower layer and on the other hand the oily ingredients in a copper-free oily solution forming the upper layer.

3. A method for the recovery of the copper salts used as catalyst in the production of 2-chlorobutadiene-1,3 by action of hydrogen chloride on vinylacetylene comprising the steps of mixing the aqueous, oily, copper-containing residue formed in said production with naphthalene and heating the mixture for a time sufficient to permit formation of two superposed layers, and then separating the bottom layer, comprising an aqueous solution of cuprous and cupric salts, and recovering the copper salts therefrom by fractional crystallization.

4. A method for the recovery of the copper salts used as catalyst in the production of 2-chlorobutadiene-1,3 by action of hydrogen chloride on vinylacetylene comprising the steps of mixing the aqueous, oily, copper-containing residue formed in said production with naphthalene and heating the mixture for a time sufficient to permit formation of two superposed layers, and then separating the bottom layer, permitting the top layer again to separate into two superposed layers upon standing, adding the bottom layer of the latter two layers to the first separated layer, said aggregate of layers comprising an aqueous solution of cuprous and cupric salts, and recovering the copper salts from said aggregate of the two bottom layers by fractional crystallization.

5. A method for the manufacture of condensation products for industrial uses such as a rubber softener, from the aqueous, oily, copper-containing residue formed in the manufacture of 2-chlorobutadiene-1,3 by action of hydrogen chloride on vinylacetylene in the presence of copper salts as catalyst comprising the steps of mixing the residue with at least one aromatic hydrocarbon and heating the mixture for a time sufficient to permit the formation of two superposed layers, then separating the top layer, adding a condensation agent to it and causing a condensation reaction to take place in said layer by heating the same.

6. A method for the manufacture of condensation products for industrial uses such as a rubber softener, from the aqueous, oily, copper-containing residue formed in the manufacture of 2-chlorobutadiene-1,3 by action of hydrogen chloride on vinylacetylene in the presence of copper salts as catalyst comprising the steps of mixing the residue with naphthalene and heating the mixture for a time sufficient to permit the formation of two superposed layers, then separating the top layer, adding a condensation agent to it and causing a condensation reaction to take place in said layer by heating the same.

7. A method for the manufacture of condensation products for industrial uses such as a rubber softener, from the aqueous, oily, copper-containing residue formed in the manufacture of 2-chlorobutadiene-1,3 by action of hydrogen chloride on vinylacetylene in the presence of copper salts as catalyst comprising the steps of mixing the residue with at least one aromatic hydrocarbon and heating the mixture for a time sufficient to permit the formation of two superposed layers, then separating the top layer, adding zinc chloride to it, causing a condensation reaction to take place in said layer by heating the same and then washing it.

8. A method for the manufacture of condensation products for industrial uses such as a rubber softener, from the aqueous, oily, copper-containing residue formed in the manufacture of 2-chlorobutadiene-1,3 by action of hydrogen chloride on vinylacetylene in the presence of copper salts as catalyst comprising the steps of mixing the residue with at least one aromatic hydrocarbon and heating the mixture for a time sufficient to permit the formation of two superposed layers, then separating the top layer, adding aluminum chloride to it, causing a condensation reaction to take place in said layer by heating the same and then washing it.

9. A method for the manufacture of condensation products for industrial uses such as a rubber softener, from the aqueous, oily, copper-containing residue formed in the manufacture of 2-chlorobutadiene-1,3 by action of hydrogen chloride on vinylacetylene in the presence of copper salts as catalyst comprising the steps of mixing the residue with at least one aromatic hydrocarbon and heating the mixture for a time sufficient to permit the formation of two superposed layers, then separating the top layer, adding ferric chloride to it, causing a condensation reaction to take place in said layer by heating the same and then washing it.

10. A method for the manufacture of condensation products for industrial uses such as a rubber softener, from the aqueous, oily, copper-containing residue formed in the manufacture of 2-chloro-butadiene-1,3 by action of hydrogen chloride on vinylacetylene in the presence of copper salts as catalyst comprising the steps of mixing the residue with at least one aromatic hydrocarbon and heating the mixture for a time sufficient to permit the formation of two superposed layers, then separating the top layer, washing the same, removing the water, adding aluminum chloride to the remainder and causing a condensation reaction to take place in said remainder by heating the same.

11. A method for the manufacture of condensation products for industrial uses such as a rubber softener, from the aqueous, oily, copper-containing residue formed in the manufacture of 2-chlorobutadiene-1,3 by action of hydrogen chloride on vinylacetylene in the presence of copper salts as catalyst comprising the steps of mixing the residue with at least one aromatic hydrocarbon and heating the mixture for a time sufficient to permit the formation of two superposed layers, then separating the top layer, washing the same, removing the water, adding ferric chloride to the remainder and causing a condensation reaction to take place in said remainder by heating the same.

STANISLAV LANDA.
OLDŘICH NĚMEČEK.

REFERENCES CITED

The following references are of record in the file of this patent:

UNITED STATES PATENTS

| Number | Name | Date |
| --- | --- | --- |
| 2,244,284 | Britton et al. | June 3, 1941 |
| 2,384,361 | Amos | Sept. 4, 1945 |

OTHER REFERENCES

Thomas: "Anhydrous Aluminum Chloride in Organic Chemistry," pp. 108–122 (1941).